L. L. SCHMIDT & T. W. BEUCHEL.
SIGNAL DEVICE FOR AUTOMOBILES.
APPLICATION FILED JUNE 12, 1915.
1,215,203.
Patented Feb. 6, 1917.
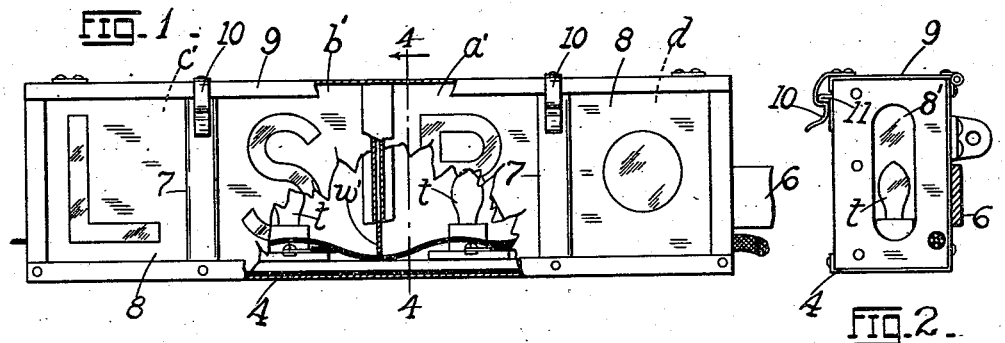
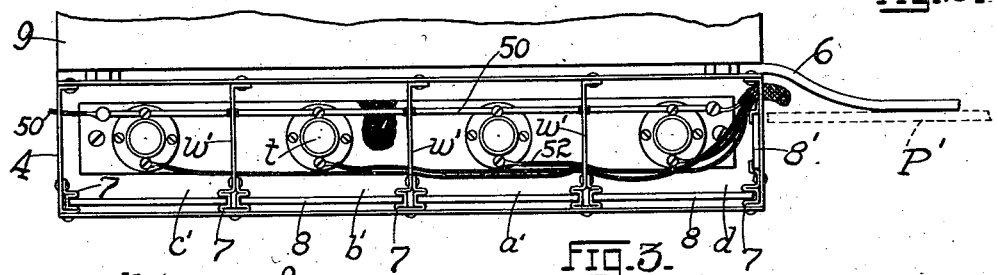
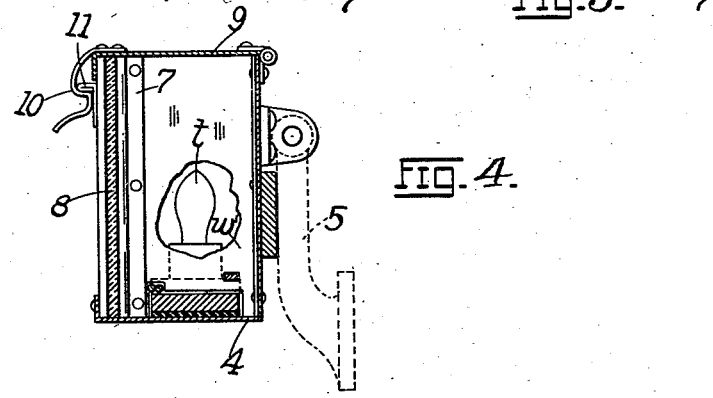
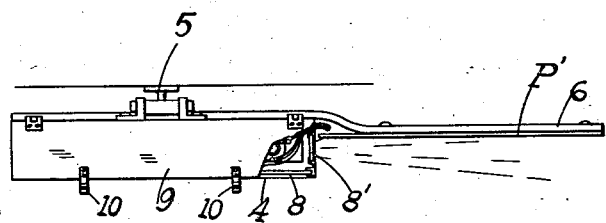
WITNESSES:
INVENTORS.
Leonard L. Schmidt
Theodore W. Beuchel
BY
ATTORNEY.

UNITED STATES PATENT OFFICE.

LEONARD L. SCHMIDT AND THEODORE W. BEUCHEL, OF BELLEVILLE, ILLINOIS.

SIGNAL DEVICE FOR AUTOMOBILES.

1,215,203.  Specification of Letters Patent.  Patented Feb. 6, 1917.

Application filed June 12, 1915. Serial No. 33,720.

*To all whom it may concern:*

Be it known that we, LEONARD L. SCHMIDT and THEODORE W. BEUCHEL, citizens of the United States, residing at Belleville, in the county of St. Clair and State of Illinois, have invented certain new and useful Improvements in Signal Devices for Automobiles, of which the following is a full, clear, and exact description, reference being had to the accompanying drawings, forming a part hereof.

Our invention has relation to improvements in signal devices for automobiles; and it consists in the novel features of construction more fully set forth in the specification and pointed out in the claim.

The present improvement is particularly directed to signal devices which shall indicate the direction of the proposed route of an automobile or other vehicle after dark, so that pedestrians and occupants of vehicles both in front and in the rear of the signaling machine may be informed in ample time in what particular direction such machine is about to travel. The object of the invention is to provide a system of electrically-controlled signals which, upon the manipulation of a proper switch, push-button or equivalent circuit-closing device, will respond in the form of an illuminated sign or letter (or sounding device), at each end of the automobile (or other vehicle) in full view (or hearing) of all persons who happen to be in the path or neighborhood of such vehicle, thereby giving ample time to prevent collision or avoid accidents. A further object is to provide means for permanently illuminating the license tag or plate from the common source of electric current which traverses the switch or push-button aforesaid. The advantages of the invention will be fully apparent from a detailed description thereof in connection with the accompanying drawings in which—

Figure 1 is an outside elevation of the rear light casing or box of an automobile, with parts broken away; Fig. 2 is an end elevation thereof with license-carrying bracket in cross-section; Fig. 3 is a top plan of Fig. 1 with lid removed; Fig. 4 is a vertical cross-section on the line 4—4 of Fig. 1; and Fig. 5 is a top plan of the rear light casing showing the manner of mounting the same, parts being broken away.

Referring to the drawings, 4 represents the rear light casing or box, preferably suspended or hinged to a bracket 5 secured to any convenient part of the machine, the back of the casing being provided with a laterally projecting arm or bracket 6 to which the rear license plate P' is secured. The casing 4 is divided into a series of adjacent compartments $a'$, $b'$, $c'$, and a fourth tail light compartment $d$, the front ends of the division walls $w'$ between said compartments and the ends of the casing being equipped with grooved or channeled strips 7 for receiving the transparent slides or plates 8 on which are marked or formed the transparent direction letters R, S, L. The several compartments $a'$ $b'$ $c'$ $d$, are likewise provided with electric light bulbs $t$ as fully shown on the drawings, the same being protected by the hinged lid or top 9 as shown, and which automatically locks when closed, by means of the spring latches 10 engaging the keepers 11. The outer side of the compartment $d$ is provided with a glass window (or opening) 8' through which the light rays may reach the license tag P' (Fig. 5). The electric current may be sent through the lighting filament of the bulb $t$ of any compartment $a'$, $b'$, $c'$, $d$, by a system of switches or push buttons well understood in the art.

By sending the light into its proper compartment, the particular letter L, R, S, will be illuminated, thus indicating to the pedestrian or other vehicle drivers, the intended direction of travel of the machine. Obviously, the invention is not to be restricted to "rear" casings, but may be applied to front casings as well.

Having described our invention what we claim is:

In a signaling device for vehicles, a casing provided with a series of horizontally disposed compartments, means for lighting the interior of said compartments, a front slide for each compartment provided with a transparent or light-conducting signal symbol, and partitions separating said compartments, the partitions having their edges at the front of the casing formed into oppositely disposed grooves open at the top of the casing, each groove coöperating with the opposite groove on the adjacent partition to form a pair for receiving the aforesaid slides.

In testimony whereof we affix our signatures in presence of two witnesses.

LEONARD L. SCHMIDT.
THEODORE W. BEUCHEL.

Witnesses:
EMIL STAREK,
JOS. A. MICHEL.